O. GREGOIRE.
MEAT TENDERER.
APPLICATION FILED AUG. 8, 1916.

1,208,953.

Patented Dec. 19, 1916.

Witnesses
H. Windridge
J. S. —

Inventor
Oscar Grégoire

By Victor J. Evans
Attorney

UNITED STATES PATENT OFFICE.

OSCAR GRÉGOIRE, OF WOONSOCKET, RHODE ISLAND.

MEAT-TENDERER.

1,208,953.	Specification of Letters Patent.	Patented Dec. 19, 1916.

Application filed August 8, 1916. Serial No. 113,818.

*To all whom it may concern:*

Be it known that I, OSCAR GRÉGOIRE, a subject of the King of Great Britain, residing at Woonsocket, in the county of Providence and State of Rhode Island, have invented new and useful Improvements in Meat-Tenderers, of which the following is a specification.

This invention relates to a meat tenderer so designed to effectually premasticate the meat operated on, thereby it will not only tender and thereby not only render the same more digestible.

A further object of the invention resides in providing a meat tenderer of the above stated character which shall be simple in construction, durable in use, manufactured and sold at a minimum cost, and wherein means are employed for effecting a simultaneous operation of the cutter to produce the tendering and shredding of the meat operated on.

To this end, use is made of a knife pivotally connected to a lever, and means connected with the knife, whereby operation of the lever will impart a vertical and rocking movement to the cutter, thus effecting the tendering and shredding of the meat to render the same more digestible.

With the above and other objects in view, the invention consists in the novel features, details of construction and combination of parts which will hereinafter be more fully set forth, illustrated in the accompanying drawing and pointed out in the appended claims.

Figure 1:
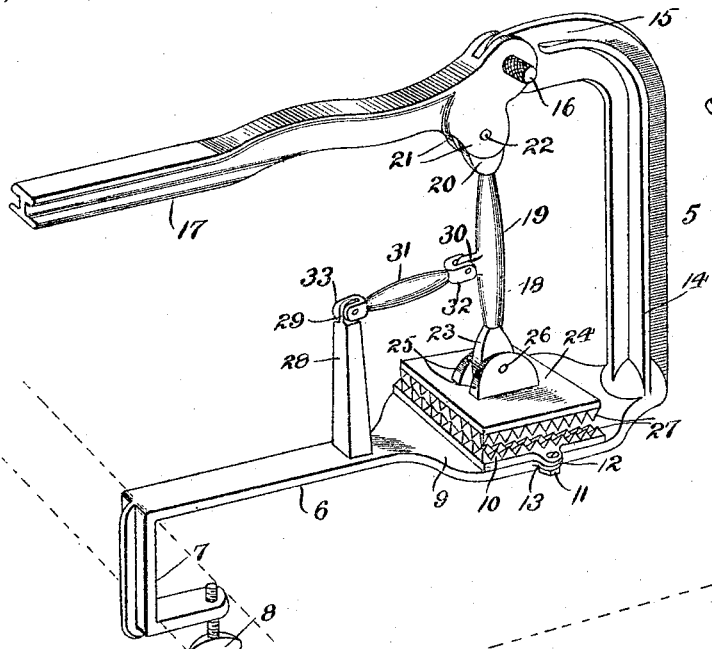
Figure 2:
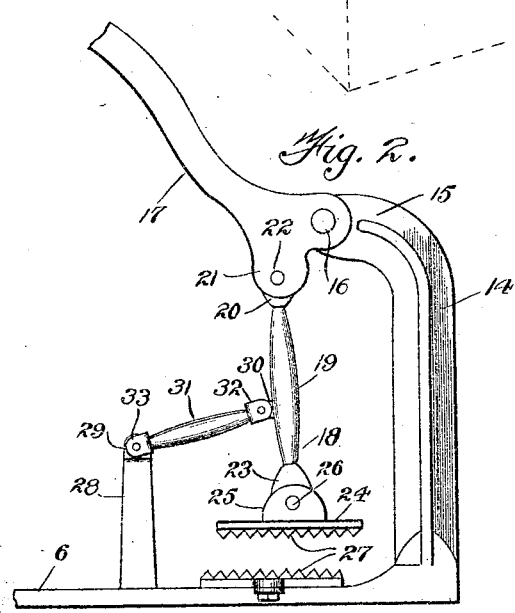
Figure 3:
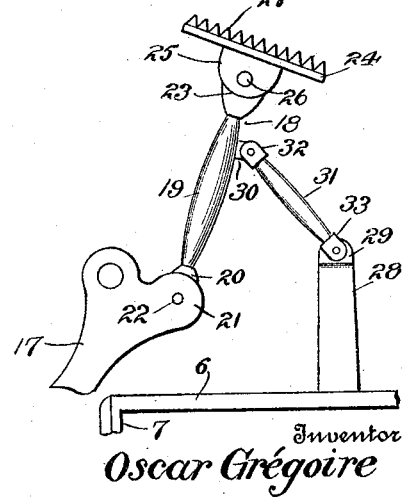

Figure 1 is a perspective view of the device attached for use and shown in operative position; Fig. 2 is a side elevation of the device showing the knife in a raised position; and Fig. 3 is a view similar to Fig. 2, with the lever disconnected from the standard and illustrating the positioning of the knife in cleansing position.

Referring more particularly to the accompanying drawing, in which like characters of reference refer to corresponding parts in the several views, 5 denotes the meat tenderer generally, comprising a base 6 formed at one end with a U-shaped bracket 7, adapted for detachably connecting the device to a bench, table or the like article. Carried by the bracket 7 is a thumb nut 8 for permanently connecting the device to such bench, table or the like. The opposite extremity of the base 6 is formed with a broad flattened surface 9, to which is detachably connected a fixed cutting plate 10 through the medium of nuts 11 which pass through the apertured ears 12 of the plate and also through the opposite laterally extending ears 13 formed on the longitudinal edges of the broad flattened portion 9 of said base. Rising from the forward extremity of the base 6 at a point in advance of the flattened broadened portion 9 thereof is a vertical standard 14 formed with an inwardly curved extension 15, to which is pivotally connected, through the medium of the pin 16, a hand operated lever 17. The hand operated lever 17 has pivotally connected thereto at a point directly below its point of pivotal connection with the standard 14, a cutter 18. The said cutter comprises a rod 19 having its flattened end 20 pivotally connected between the forwardly and downwardly extending spaced ears 21 of the lever, through the medium of the pin 22, while connected to the lower flattened terminal portion 23 of the rod 19 is a second or movable cutting plate 24. The cutting plate 24 is formed on its upper surface with parallel ears 25 between which the flattened end 23 of the rod is pivotally connected through the medium of the pin 26. The confronting or active faces of both the stationary and movable cutting plates are provided with sharpened teeth 27, which will tender and press the steak between the cutting plate upon the actuation of the hand operated lever 17 in a downward direction. This motion of the lever imparts a vertical reciprocating movement to the movable cutter 24. It is my purpose, however, to so connect the movable cutter with the device, whereby the same will rock and move in a longitudinal plane with respect to the fixed cutting plate 10. To this end, use is made of a vertical upstanding post 28 formed on the base 6 in alinement with the standard, and provided with a reduced apertured upper end 29. The rod 19 of the movable cutter is formed with a laterally extending apertured lug 30. The character 31 denotes an operating link formed with bifurcated ends 32 and 22. The bifurcated end 32 of the link is pivotally connected with the lug 30 of the rod 19, while the bifurcated end 33 of the link is pivotally connected to the reduced upper end 29 of the post 28. The link when in connected position, will lie in a longitudinal plane with the base 6 and at right angles with the rod 19.

I desire to have it understood that by the removal of the pin 16 from the extension 15, the movable cutter may be swung in an inverted position to enable a thorough and easy cleaning of the cutters, as the occasion may so demand.

From the foregoing description, taken in connection with the accompanying drawing, the advantages of construction and of the method of operation will be readily apparent to those skilled in the art to which the invention relates, and while I have described the principles of operation of the invention, together with the device which I now consider to be the best embodiment thereof, I desire to have it understood that the device shown is merely illustrative, and that such changes may be made when desired as are within the scope of the claims appended thereto.

I claim:

1. A meat tenderer embodying a base, a bracket formed at one end of the base for detachably connecting the same to a fixed structure, a standard rising from the opposite end of the base, a fixed cutting plate connected to said base, a movable cutting plate, a lever having pivotal connection with the movable cutting plate for imparting reciprocating movement thereto, and means for rocking said lever.

2. A meat tenderer embodying a base, a bracket formed at one end of the base for detachably connecting the same to a fixed structure, a standard rising from the opposite end of the base, a fixed cutting plate connected to said base, a movable cutting plate, a lever having pivotal connection with the movable cutting plate for imparting reciprocating movement thereto, and means for rocking said lever, and means for moving the said movable cutter longitudinally of the fixed cutter.

In testimony whereof I affix my signature.

OSCAR GRÉGOIRE.

Copies of this patent may be obtained for five cents each, by addressing the "Commissioner of Patents, Washington, D. C."